Figure 1:
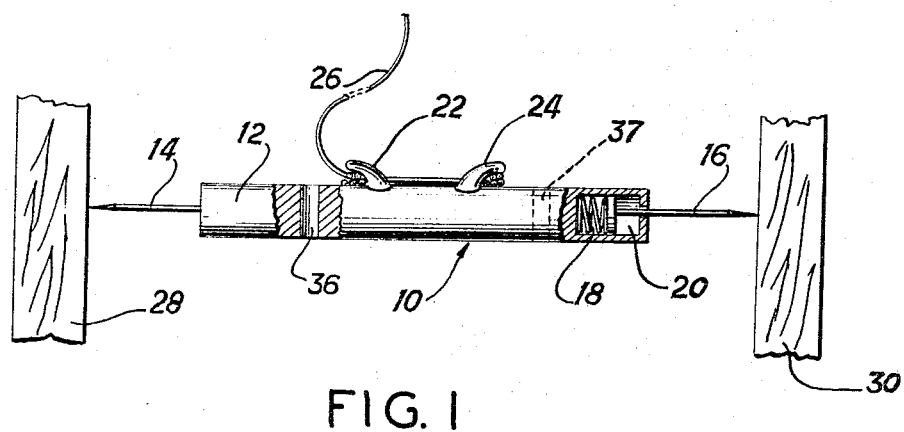

May 16, 1967  J. V. CAMLET  3,319,904
TOOL CONSTRUCTION
Filed Aug. 26, 1965

INVENTOR
JOHN V. CAMLET
BY
Moses, McGlew & Toren
ATTORNEYS.

United States Patent Office 3,319,904
Patented May 16, 1967

3,319,904
TOOL CONSTRUCTION
John V. Camlet, 317 Getty Ave.,
Paterson, N.J. 07503
Filed Aug. 26, 1965, Ser. No. 482,773
5 Claims. (Cl. 242—85.1)

This invention relates in general to tool construction, and in particular to a new and useful small hand tool for carrying and fixing a reference line, which line may be wound off a rod element for establishing reference points or for suppending objects from a wall such as a plumb bob.

The present invention is particularly applicable for use as a carpenter's tool and it is an improvement over the prior art devices inasmuch as it provides a means for readily anchoring a reel or wound length of line in a manner permitting it to be drawn off from the anchored location, such as for establishing a reference line or, for example, for supporting a plumb bob in a manner permitting it to be oriented with any reference point such as on a wall or ceiling or the like.

In accordance with the invention, the device includes a rod element having a pointed end or a metal projection which is pointed which may be engaged into a wall element such as a stud. The opposite end carries a similar pointed element which is retractable so that it may be oriented between two studs or various spacings for the purpose of establishing the rod element in a desired orientation.

A feature of the construction is that the rod element includes means for storing a line thereon which may be drawn off from an established reference point, for example, such as a hook element of the rod member, for the purpose of establishing a reference line for orienting wall structures or in surveying and the like. The device advantageously includes one or more through bores defined in the rod member which may be used for anchoring the end of the line or for facilitating the securing of the rod member to a wall structure such as when it is suspended vertically for the purpose of suspending a plumb bob from the end of the line.

Accordingly, it is an object of the invention to provide an improved tool which includes a rod member having means for securing its ends to a wall structure, preferably with one end being telescopic to facilitate the securing of the rod member, and which further includes means for storing a length of line thereon which may be drawn off for establishing a reference point or for suspending an object therefrom.

A further object of the invention is to provide a tool of a nature which includes means for securing it to a supporting structure for establishing reference lines in either a vertical or horizontal manner.

A further object of the invention is to provide a carpenter's tool or the like which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

Figure 2:
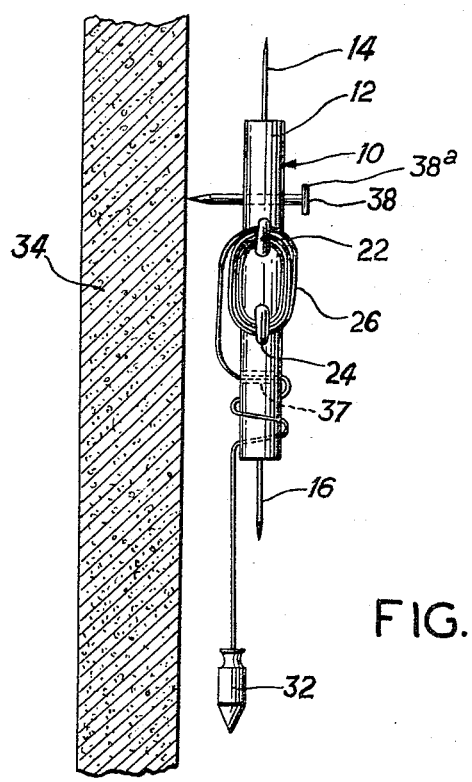

In the drawings:

FIG. 1 is a partial elevational and partial sectional view of a carpenter's tool constructed in accordance with the invention; and FIG. 2 is a side elevational view of the tool indicated in FIG. 1 but shown in a manner in which it is oriented so that it can be used to suspend the plumb bob from a wall structure.

Referring to the drawings in particular, the invention embodied therein comprises a carpenter's tool generally designated 10 which includes a rod element or body member 12 having a rigid or fixed pointed member 14 extending outwardly from one end which is advantageously made of a durable metal. The opposite end carries a telescopic pointed member 16 which is biased in an outward direction by a spring 18 retained in a cavity 20 defined in this end of the rod member 12.

In accordance with the invention, the rod member 12 provides means for storing a length of line which in the embodiment illustrated includes spaced hook elements 22 and 24 around which a length of line 26 is wound.

In some instances it is desirable to wind the line 26 around the body of the rod member 12, and for this purpose of the pointed members 14 and 16 is mounted so that they will rotate in the body 12 in order to facilitate the winding up and paying out of the line when it is wound around the body member.

As indicated in FIG. 1, the tool 10 may be easily installed between two reference points, for example, two studs 28 and 30 in a wall frame structure. In order to accomplish this, the fixed pointed member 14 is advantageously pushed into the stud 30 to establish a reference hole, and then the telescopic pointed member 16 is inserted into this hole and telescoped within the cavity 20 until the pointed member 14 is oriented with the next adjacent stud 28. When the rod element 12 is brought to the desired angle between the studs 28 and 30, the pointed member 14 is then pushed into the stud 28 to secure it in position.

The tool 10 may be used in the manner indicated in FIG. 2 for supporting a plumb bob 32 from a wall structure 34. For this purpose, the rod element 12 is provided with a plurality of openings or through bores 36. In the embodiment illustrated two holes 36 and 37 are provided. The bores provide means for inserting a nail member or securing member 38 through the rod member 12 in order to anchor the rod member so that it may be suspended from a wall structure 34 in a vertical position or at any desired angle. In some instances it is desirable that the nail member 38 be permanently secured to the rod member such as by being trapped by a rotatable collar (not shown) defined around the bore 36. When this is done, then the tool is always ready for securement to the wall structure simply by applying a pressure, such as through a hammer on a head portion 38a of the nail member.

After the rod member 12 is secured to the wall structure 34 in the manner illustrated in FIG. 2, the line 26 may be directed through the bore 37, for example, and a turn and hitch may be made around the body after the desired length of line between the body and the plumb bob has been established in order to secure the line at the end of the body member 12.

Thus, the device provides a simple and inexpensive tool which may be used for orienting a reference line in any desired horizontal or vertical or angular location in respect to the horizontal and vertical in a simple and easy manner.

While a specific embodiment of the invention has been shown and described in detail to illustrate the application of the inventive principles, it will be understood that the invention may be embodied othe rwise without departing from such principles.

What is claimed is:

1. A tool, for mounting between studs of a framework for supporting a reference line, comprising a substantially rectilinear rod member having a pointed fixed portion at one end engageable in a stud and a pointed portion, which is telescopic within said rod member, at its opposite end and engageable in an adjacent stud, and means on said rod member for storing a length of reference line for withdrawing from said rod member.

2. A tool, as claimed in claimed 1, said means on said rod member for storing a length of line including spaced hooks defined on the exterior surface of said rod member, said hooks providing means for winding the reference line therearound.

3. A tool, as claimed in claim 2, said rod member having a plurality of bores defined therethrough providing guide openings for anchoring rod member means and for the reference line.

4. A carpenter's tool and the like, for mounting between adjacent studs of a framework for supporting a reference line, comprising a substantially rectilinear rod member having at least one bore defined therethrough extending perpendicular to the longitudinal axis thereof, a rigid metallic pointed element secured to one end of said rod member and extending longitudinally outwardly therefrom for engagement in a stud, said rod member having a cavity defined in its opposite end, a telescopic pointed member having a portion slidable in said cavity and extending longitudinally outwardly from this opposite end of said rod member for engagement in an adjacent stud, spring means biasing said telescopic member outwardly from this opposite end of said rod member, and hook means defined on said rod member for winding a length of reference line therearound for withdrawing said reference line from said rod member, said bore providing for hanging of said rod member on a nail or the like and for drawing of said reference line therethrough.

5. A carpenter's tool and the like, as claimed in claim 4, said hook means including spaced hook elements spaced longitudinally along the length of said rod and a length of reference line wound around said hook elements.

References Cited by the Examiner
UNITED STATES PATENTS

| | | | |
|---|---|---|---|
| 698,223 | 4/1902 | Prideaux | 211—105 X |
| 1,275,735 | 8/1918 | Phillips | 242—85 |
| 2,439,010 | 4/1948 | Lange | 242—85 X |
| 2,690,152 | 9/1954 | Riccio | 242—85 X |
| 3,001,754 | 9/1961 | Fowler | 211—105 X |

FRANK J. COHEN, *Primary Examiner.*

N. L. MINTZ, *Assistant Examiner.*